US010931521B2

(12) United States Patent
Wang et al.

(10) Patent No.: US 10,931,521 B2
(45) Date of Patent: Feb. 23, 2021

(54) SOFTWARE DEFINED NETWORK SYSTEM WITH AUTO-DEPLOYED SWITCH AND METHOD FOR DEPLOYING SWITCH

(71) Applicant: INDUSTRIAL TECHNOLOGY RESEARCH INSTITUTE, Hsinchu (TW)

(72) Inventors: Wei-Cheng Wang, Taichung (TW); Hou-Ren Chen, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 306 days.

(21) Appl. No.: 15/836,848

(22) Filed: Dec. 9, 2017

(65) Prior Publication Data

US 2019/0075019 A1 Mar. 7, 2019

(30) Foreign Application Priority Data

Sep. 1, 2017 (TW) ................................ 10613003.1

(51) Int. Cl.
*H04L 12/24* (2006.01)
(52) U.S. Cl.
CPC ...... *H04L 41/0806* (2013.01); *H04L 41/0886* (2013.01)
(58) Field of Classification Search
CPC ................. H04L 41/0806; H04L 41/0886
USPC ....................................................... 709/222
See application file for complete search history.

(56) References Cited

U.S. PATENT DOCUMENTS

| 9,386,047 | B2* | 7/2016 | Wang ............... H04L 65/1069 |
| 9,521,071 | B2* | 12/2016 | Madabushi ............ H04L 45/38 |
| 9,571,382 | B2 | 2/2017 | Li et al. | |
| 9,742,656 | B2* | 8/2017 | Zheng ................. H04L 45/38 |
| 2013/0266007 | A1* | 10/2013 | Kumbhare ............. H04L 45/56 370/389 |
| 2015/0326526 | A1* | 11/2015 | Zeng .................... H04L 61/103 370/392 |
| 2015/0363522 | A1* | 12/2015 | Maurya ................. H04L 43/50 703/13 |

(Continued)

FOREIGN PATENT DOCUMENTS

| CN | 103780471 B | 5/2014 |
| CN | 104104572 A | 10/2014 |

(Continued)

OTHER PUBLICATIONS

Taiwanese Office Action issued in corresponding application No. 108130031, dated May 17, 2018.

(Continued)

*Primary Examiner* — Moustafa M Meky
*Assistant Examiner* — Sahera Halim
(74) *Attorney, Agent, or Firm* — Maschoff Brennan

(57) ABSTRACT

An SDN (Software Defined Networking) system with auto-deployment switches and a method for auto-deploying the switches in said SDN system are proposed. The method includes: actively sending a configuration message out by a controller, with said configuration message having an IP (Internet Protocol) address of the controller and a plurality of parameters; receiving the configuration message by a switch; and building a connection between the switch and the controller according to the IP address of the controller and the plurality of parameters.

22 Claims, 5 Drawing Sheets

(56) References Cited

U.S. PATENT DOCUMENTS

| | | | |
|---|---|---|---|
| 2016/0072762 A1* | 3/2016 | Liang | H04L 45/56 |
| | | | 709/245 |
| 2016/0337188 A1 | 11/2016 | Yang et al. | |
| 2016/0337937 A1* | 11/2016 | McCann | H04L 45/64 |
| 2017/0019373 A1* | 1/2017 | Meng | H04L 61/256 |
| 2017/0104672 A1* | 4/2017 | Liang | H04L 45/30 |
| 2017/0126546 A1* | 5/2017 | Aslam | H04L 45/30 |
| 2017/0195254 A1* | 7/2017 | Pham | H04L 49/25 |
| 2017/0214609 A1* | 7/2017 | Fujii | H04L 12/4641 |
| 2018/0041555 A1* | 2/2018 | Manohar | H04L 12/44 |
| 2018/0091366 A1* | 3/2018 | Muniswamy | H04L 41/0803 |
| 2019/0296998 A1* | 9/2019 | Shaikh | H04L 41/042 |

FOREIGN PATENT DOCUMENTS

| | | | |
|---|---|---|---|
| CN | 104202364 A | 12/2014 | |
| CN | 104796298 A | 7/2015 | |
| CN | 105430116 A | 3/2016 | |
| EP | 2975807 A1 | 1/2016 | |
| TW | I566544 A | 11/2016 | |
| WO | 2013/134937 A1 | 9/2013 | |
| WO | 2014/139276 A1 | 9/2014 | |

OTHER PUBLICATIONS

Jian Wang, et al., "FSDM: Floodless servicediscovery model based on Software-Defined Network", Communications Workshops (ICC), Jun. 9, 2013 IEEE.

Minseok Lee, et al., "A home cloud-based home network autoconfiguration using SDN", Networking, Sensing and Control (ICNSC), Apr. 9, 2015 IEEE 12th.

Rashid Amin, et al., "Auto-Configuration of ACL Policy in Case of Topology Change in Hybrid SDN", IEEE Access, Dec. 19, 2016.

Rohit Katiyar, et al., "Auto-Configuration of SDN Switches in SDN/Non-SDN Hybrid Network", AINTEC '15 Proceedings of the Asian Internet Engineering Conference, Nov. 18, 2015.

Sejun Lee, et al., "DNS Name Autoconfiguration for IoT Home Devices", Advanced Information Networking and Applications Workshops (WAINA), Mar. 25, 2015 IEEE 29th.

Yuri Demchenko, et al., "Enabling Automated Network Services Provisioning for Cloud Based Applications Using Zero Touch Provisioning", Utility and Cloud Computing (UCC), Dec. 7, 2015 IEEE/ACM 8th.

* cited by examiner

SOFTWARE DEFINED NETWORK SYSTEM WITH AUTO-DEPLOYED SWITCH AND METHOD FOR DEPLOYING SWITCH

CROSS-REFERENCE TO RELATED APPLICATIONS

This non-provisional application claims priority under 35 U.S.C. § 119(a) on Patent Application No(s). 106130031 filed in Taiwan on Sep. 1, 2017, the entire contents of which are hereby incorporated by reference.

TECHNICAL FIELD

This disclosure relates to an SDN (Software-Defined Network) system with controllers and switches and a method for deploying switches in a network.

RELATED ART

Most architectures of Ethernet networks are still built under the Spanning Tree Protocol (STP), and delivering packets through many kinds of transmission protocols. However, while the number of cloud application services and the requirements of big data are increasing, the routing table used for packet delivery is getting more and more complicated, thus the present internet architecture becomes insufficient in practical use. For implementing kinds of transmission protocols, switches or routers need to fragment and reassemble packets frequently, leading to poor transmission efficiency because of inefficient usage of internet bandwidth.

SDN (Software-Defined Network) is a concept of network-control virtualization, SDN separates the control plane from the forwarding plane, and using the software called "Controller" to unify the management of the control plane. Under the premise of non-replacement of hardware devices, the "Controller" centralizes the management and reorganizes the network in a programming manner, providing a new way for network traffic control and providing a good platform for core network and application innovation. SDN greatly increases the flexibility and performance of network operations because of centralized management and programmable management let. Meanwhile, SDN decreases the cost of services and management.

OpenFlow is a communication protocol, and is designed just for SDN. OpenFlow offers a consistent interface for the control plane and the forwarding plane to communicate correctly, and the controller is able to set the switches' forwarding plane to determine the path of network packets across a network of switches. OpenFlow is already extensively applied in SDN network devices.

For a giant data center, during an early stage of network equipment construction, each switch has a large number of configuration parameters waiting to be set, for example, the IP (Internet Protocol) address of each switch, available connecting port number(s). In an OpenFlow environment performed in an SDN architecture, the administrator also needs to set the following configuration parameters on each switch: the IP address of the controller corresponding to the switch, the controller's connecting port number, the type of communication protocol, the controller's connection mode and the version number of OpenFlow. When the administrator doing such setting jobs, he needs to log in each switch and then fills the right parameters via the CLI (Command-Line Interface) one after another. It is very inconvenient and time-consuming. Furthermore, setting parameters in this way could not immediately modify the parameters to the variation of internet architecture. It is also easy to cause mistakes when the parameters are set by a human. Once the administrator inputs a wrong instruction or misses even one parameter only, there is always a high risk of internet meltdown.

Although there are some methods for a switch to request the configuration actively. For example, when the switch using DHCP (Dynamic Host Configuration Protocol), PPPoE (Point-to-Point Protocol Over Ethernet), or ARP (Address Resolution Protocol) to acquire its IP address from the controller, the switch asks the controller to return other configuration parameters through the packet's extension field of above protocols. However, switch performing this kind of active-switch method could acquire said other configuration parameters for once only. If the switch needs to modify the configuration parameters thereafter, it has to get contact with the controller in another way. The inconsistent of configuration methods, acquiring the configuration parameters in different ways surely leads to troubles in administration.

Furthermore, if the network administrator adopts the hybrid network architecture that the SDN and the conventional distributed network are connected by a router/gateway for the downward compatibility while the switch and the controller has in-band connection, the configuration packets cannot arrive another subnet by crossing the router of gateway under foregoing communication protocols used in LAN (Local Area Network). Such situation increases the implemented difficulty of auto-deployment of all switches in a network.

SUMMARY

According to one or more embodiments of this disclosure, a method for deploying switch in an SDN system, wherein the SDN system comprises a controller in communicable connection with a switch, the method comprising sending a configuration message from the controller to the switch, wherein the configuration message comprises an IP (Internet Protocol) address of the controller and a plurality of configuration parameters; receiving the configuration message by the switch; and establishing a channel between the switch and the controller according to the IP address and the plurality of configuration parameters by the switch.

According to one or more embodiments of this disclosure, an SDN system with auto-deployed switch comprises a controller configured for sending a configuration message, with the configuration message comprising an IP address of the controller and a plurality of configuration parameters; and a switch in communicable connection with the controller, wherein the switch receives the configuration message and establishes a channel with the controller according to the IP address and the plurality of configuration parameters.

According to one or more embodiments of this disclosure, a method for deploying switch applicable for at least one switch, with said at least one switch in communicable connection with a controller, the method comprising receiving a configuration message by one of said at least one switch, with the configuration message comprising an IP address of the controller and a plurality of configuration parameters; and establishing a channel to the controller according to the IP address and the plurality of configuration parameters by the switch receiving the configuration message.

According to one or more embodiments of this disclosure, an automatic-configured switch applicable for SDN system comprising a controller in communicable connection with a switch, the switch comprising a transceiver configured to receive a configuration message, with the configuration message comprising an IP address of the controller and a plurality of configuration parameters; a storage unit configured to store the configuration message; and a processing unit configured to establish a channel to the controller according to the IP address and the plurality of configuration parameters.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

For the simplicity of description in the following embodiments, the "controller" mentioned in later paragraphs means SDN controller, the "switch" means the kind of switches supporting the OpenFlow, NETCONF (NETwork CONFiguration) protocol, OVSDB (Open vSwitch Database) management protocol or XMPP (Extensible Messaging and Presence Protocol).

Figure 1:
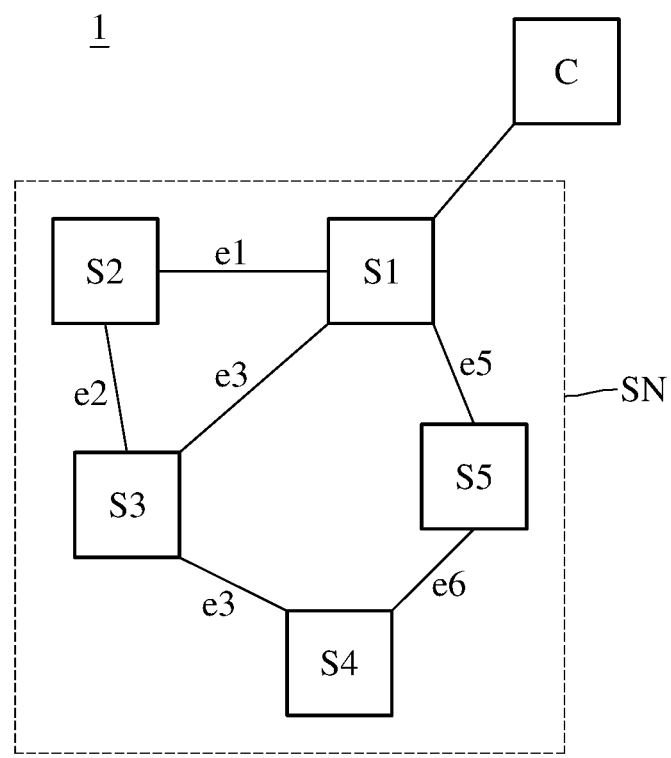
FIG. 1 is a schematic view of communicable connection in SDN system according to an embodiment of the present disclosure.

An embodiment of an SDN system with auto-deployed switch is applicable for the operation of the above communication protocols in SDN architecture. As shown in FIG. 1, the SDN system with auto-deployed switch comprising a controller C and a switch network SN. The controller C is in communicable connection with the switch network SN. The switch network SN has a plurality of switches S1-S5, and said switches S1-S5 are in communicable connection with each other. However, the disclosure does not restrict the number of controller C and the switch network SN. In another embodiment, the SDN system with auto-deployed switch in this disclosure has one controller C and a single switch S1. Practically speaking, the network administrator builds the SDN system with one or multiple controllers connecting to one or multiple switch networks based on the SDN application scenario.

In a connection between two switches or a controller and a switch, both sides could send/receive a message to each other once there is a communicable connection between said sides. In general, the so-called communicable connection means the connecting relationship for the electronic message transmission available from one side to another side, and vice versa. For example, the message-passing path in the switch network SN could be the direct connection between two switches, such as the connection from the switch S1 to the switch S2 via physical link e1 in FIG. 1. However, the message-passing path could also be an indirect connection such as the connection from the switch S1 to the switch S3 via physical link e1 and e2 through the forwarding of the switch S2.

Practically speaking, controller C is an application program operating on a server, a PC or other electronic device available for said application and for internet communication function. Each of the switches S1-S5 is a high-efficiency hardware switch with ASIC (Application Specific Integrated Circuit) or FPGA (Field Programmable Gate Array) circuit inside or software operating on a server with switching function virtualized inside. The disclosure does not restrict the type of controllers or switches in use.

In an embodiment, the controller C repeatedly outputs the configuration messages to configure all switches S1-S5 in the switch network SN. Additionally, the controller C may change the interval time between two configuration messages to adjust the configuration frequency according to a timer. In the embodiment, the hardware devices of switch network SN have already connected. The controller C periodically sends the configuration message as long as the controller C was activated. In a real SDN scenario, the switch network SN further adds switches according to the requirement, and the controller C sends the configuration message once it detects a new online switch. Namely, the timing for sending the configuration message by the controller C is not thus restricted by the interval time setting.

The content of a configuration message comprises the IP (Internet Protocol) address of said controller C and a plurality of configuration parameters. The plurality of configuration parameters comprises the number of controller's connecting port and the type of communication protocol, like TCP (Transmission Control Protocol), TLS (Transport Layer Security), SCTP (Stream Control Transmission Protocol) or SSL (Secure Sockets Layer), etc. In other embodiments, in addition to the examples of configuration parameters stated above, the connection mode of the controller and the version number of communication protocol also serve as some of the configuration parameters. In practical use, the network administrator may modify the types of configuration parameters based on the SDN application scenario, thus the content of a configuration message in this disclosure is not restricted by the above examples.

The controller C encapsulates the configuration message into a broadcast packet format or a multicast packet format. For instance, LLDPDU (Link Layer Discovery Protocol Data Unit) is a commonly used broadcast packet format. The controller organizes its IP address and several configuration parameters into different TLVs (Type/Length/Value), writes said TLVs into the optional TLV fields in LLDPDU, and then sends the LLDPDU to the switch S1 next to the controller in the switch network SN. As shown in FIG. 1, the controller C delivers the broadcast packet to the switch S1 next to the controller C in the switch network SN, through the path e1. For another instance, IP header is adapted when the configuration message is in the multicast packet format. The controller C writes its IP address and several configuration parameters into Options field in IP header, and then sends the IP packet to the switch S1 next to the controller C in the switch network SN. In an embodiment, the controller C may send the configuration message in the IP multicast packet format, thus the configuration message would not be blocked by a router or a gateway that separate the subnets for sure.

When the switch S1 receives the configuration message, the switch S1 then establishes a channel with the controller C according to the IP address and the plurality of configuration parameters. In another point of view, when the controller C sending the configuration messages in a fixed period, if the controller C receives a channel establishment request from the switch S1, it means that the switch S1 is establishing a channel with the controller C. After the channel establishment is successful, the switch S1 set the controller as a master controller or a slave controller to it. The difference between master and slave controllers lies in that the master controller has a complete authority while the slave controller only has an authority of reading the switch's status.

Under the premise of actively sending the configuration message by the controller C, if the switch receiving the configuration message (for example, switch S1) belongs to the switch network SN, the switch S1 sends the channel establishment request to controller C according to the IP address and the configuration parameters in the configuration message. At this time, the channel between the switch S1 and the controller C is established, and the controller C becomes a master controller to the switch S1. Moreover, the switch S1 may further send the configuration message to other switches next to the switch S1. Otherwise, if the switch S1 does not connect with any other switch, the switch S1 returns the configuration message to the controller C.

After the channel is established, the controller C sends a routing rule to the switch S1. In an embodiment, when the operating communication protocol is OpenFlow, the message format of the routing rule is "FlowMod", a part of "Flow entry". The flow entry comprises fields such as "Match field", "Priority", "Counter", "Instruction", "Timeout" and "Cookie". In an embodiment, the routing rule comprises "Ethernet Type (eth_type)" of Match field, "Ingress Port (in_port)" and the "Apply Action" of instruction filed. Moreover, the routing rule further comprises the IP address or MAC address of the controller C. The routing rule instructs the switch about how to deal with the configuration message packets for increasing the efficiency of configuration message transmission in the switch network SN. Some paragraphs afterward will explain in detail the way in which the switch S1 applies the received routing rule.

It should be noted that the controller C may send a single routing rule suitable for the configuration message. However, practically, after the channel is established, the controller C may send multiple routing rules at one time according to the application scenario defined ahead by the network administrator's indication. Except for those routing rules applied for configuration message, the remaining routing rules are applied for the processing tasks of normal data packets. In other words, the present disclosure does not restrict the number of routing rules sent by controller C nor the packet type that the routing rules are suitable for. Besides, in an embodiment, the switch S1 is not necessary to send the configuration message to other switches next to the switch S1 only after the switch received the routing rule. The switch S1 may send the configuration message as soon as the switch S1 receiving the configuration message without retrieving any routing rule, and next time the switch S1 sends the configuration message (and the switch S1 already received the routing rule) according to the routing rule.

Figure 2:
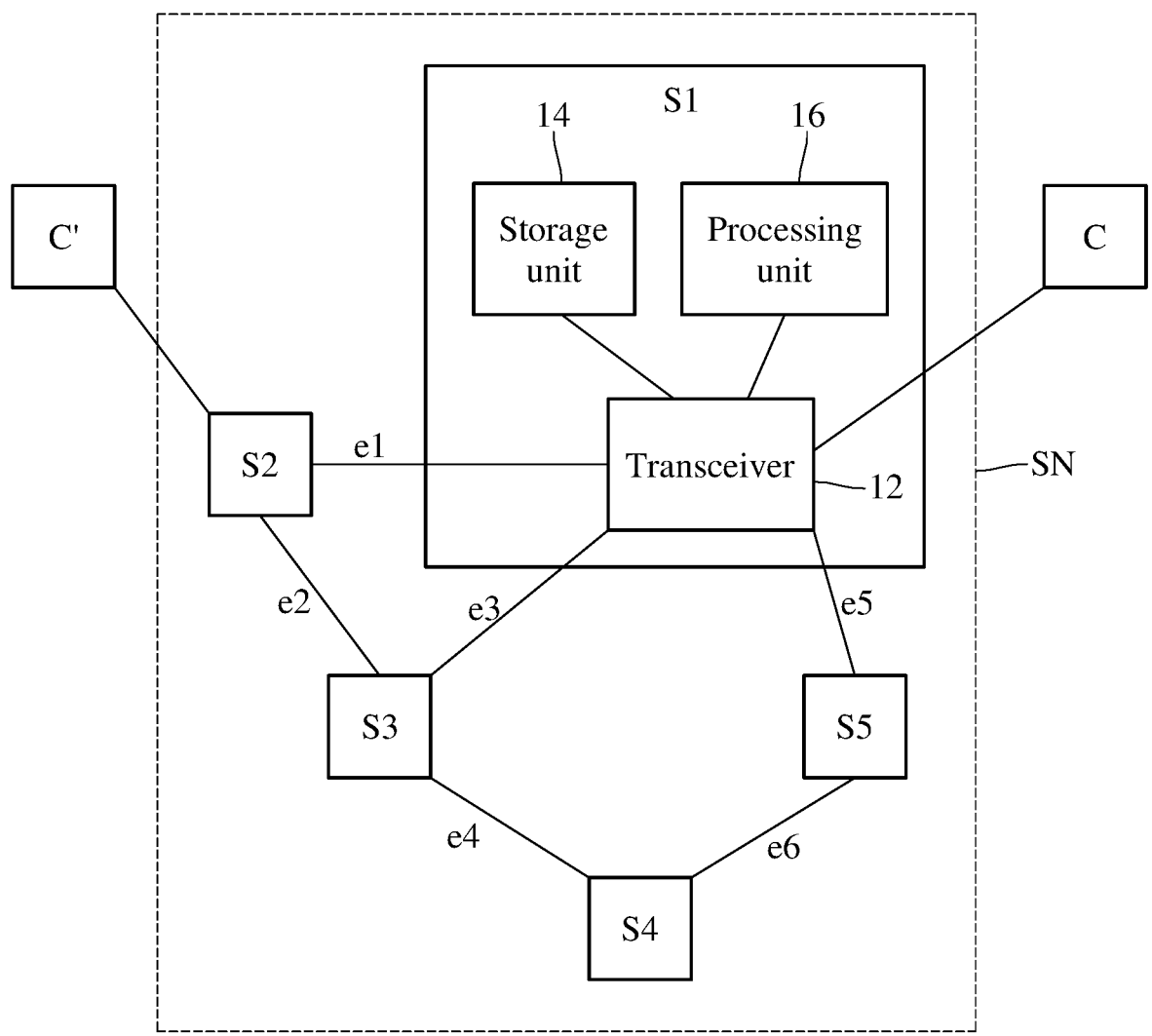
FIG. 2 is a schematic view of communicable connection in SDN system, with a block diagram of switch's functionality according to another embodiment of the present disclosure.

Please refer to FIG. 2. In another embodiment, the switch network SN has multiple identical switches that have communicable connections with each other. Specifically, every switch comprises a transceiver 12, a storage unit 14 and a processing unit 16. The transceiver 12 is for packet receiving or packet forwarding with such packet including the configuration message or routing rule described above. The storage unit 14 is for storing data such as the configuration message or routing rule described above, and can be implemented by flash memory, random access memory or ternary content addressable memory. The processing unit 16 is for connecting to the controller by sending the channel establishment request according to the IP address and the configuration parameters in the configuration message. Furthermore, the processing unit 16 electrically connects with the transceiver 12 and the storage unit 14.

In an embodiment, each switch has a configuration list stored in the storage unit 14, for recording the connection information of each controller C. That is to say, the switch adds/updates the configuration list according to the configuration messages sent by each controller, either only one or a plurality of controller applied. In general, the configuration list has a table format with multiple columns corresponding to IP address of the controller and those configuration parameters. However, the network administrator may design the data structure of configuration list according to the SDN application scenario and the disclosure does not restrict the way to store the configuration list or what format the configuration is.

After the channel is established between the controller C and the switch S1, the controller C sends the routing rule to the switch S1, and then the switch S1 applies the routing rules to configuration message packets receiving next time. Specifically, once receiving the configuration message by the transceiver 12 of the switch S1, the processing unit 16 of the switch S1 executes the foregoing connection procedure according to the IP address and the configuration parameters, determines whether the configuration list is empty or not, and determines if the IP address of controller C that sending this configuration message exists in the configuration list stored in the storage unit 14. Based on the results of the above determinations, it brings to one of the follow-up operations.

First, when the configuration list is empty, the processing unit 16 of the switch S1 extracts the controller's IP address and configuration parameters from the configuration message and adds them to the configuration list. Meanwhile, the processing unit 16 controls the transceiver 12 to send a channel establishment request to the controller C according to the controller's IP address and the configuration parameters. After the channel (such as OpenFlow channel) from the switch S1 to the controller C is established successfully, the switch S1 sets the controller C as a master controller. In other words, after activating the switch S1, the first configuration message received by the switch S1 leads to a result that the controller C sending this configuration message becomes the master controller of the switch S1.

Second, when the configuration list is not empty, the processing unit 16 of the switch S1 checks the column of controller's IP address on the configuration list to determine if any IP address therein is identical to the one in the configuration message. In other words, please refer to FIG. 2, the switch S1 needs to ensure that the controller C' which sends the configuration message this time is different from controller C sent the configuration message previously.

When the controller's IP address in the configuration message is different from all of the controller's IP addresses recorded on the configuration list, the processing unit 16 of the switch S1 adds the new controller's IP address and the configuration parameters to the configuration list. Meanwhile, the transceiver 12 of the switch S1 sends a channel establishment request to the controller C' according to the new controller's IP address and the configuration parameters. After the channel from the switch S1 to the controller C' is established successfully, the switch S1 sets the controller C' as a slave controller since the switch S1 had already set one as the master controller when it received the configuration message with the IP address already listed on the configuration list. In an embodiment, the disclosure adopts this determination policy that the switch sets a controller sending the very first configuration message received by the switch as a master controller while setting another controller sending a second or even later one received by the switch as a slave controller. However, one skilled in the related arts should know that the present disclosure does not restrict to this determination policy, and the administrator may program the policy ahead to determine how to decide the master/slave controller when the switch receives a configuration message according to the real scenario of SDN application.

Another case is that the configuration list is not empty but one of the controller's IP addresses listed on the configuration list and the one in the configuration message are identical. In other words, the related information of the controller sending the configuration message already exists on the configuration list. In this case, the processing unit 16 controls the storage unit 14 to update the parameters of the columns on the configuration list according to the configuration message. The change can be related to all of the configuration parameters or a part of the configuration parameters depending on how many parameters in the configuration message is different from those on the configuration list.

After the channel is established between the controller C and the switch S1, the controller C sends the routing rule to the switch S1. The switch S1 receives the routing rule and stores the routing rule. The routing rule comprises the Ethernet type, the input port number of the switch and the action instruction. It should be noted that in a system with multiple controllers, the routing rule further comprises the controller's IP address. Accordingly, when the switch S1 receives the configuration message packet, it determines whether or not to forward the configuration message packet according to the switch's input port number, with the switch S1 receiving the configuration message packet and the stored routing rule via an input port having this input port number. In brief, the processing unit 14 of the switch S1 executes the forwarding procedure based on the routing rule. Besides, if the SDN system of the present disclosure has multiple controllers, then the routing rules further comprise distinct controllers' IP addresses. Specifically, for the switch S1 in this kind of network system with multiple controllers, the switch S1 receives routing rules sent by every controller as soon as the switch S1 establishing the channel with every controller. And the routings rules are separated by IP address of each controller (such as the controller's IP address in Match Field) to clarify the corresponding controller.

Specifically, at the beginning, the foregoing forwarding procedure compares the Ethernet types (eth_type) of the received packet and the routing rules by the processing unit 16. For example, if both values thereof are 0x88CC, a predefined value in LLDP, the switch S1 verifies that the packet received this time is a configuration message, not a normal data packet. Next, the processing unit 16 in the switch S1 compares the input port number of the received packet to the input port number of the routing rules. Thereby, the switch S1 confirms whether the routing rule corresponding to the controller sending packet this time exists or not. The switch S1 selectively executes the following operations based on the comparing result stated as the following then.

In a first condition, judging by the processing unit 16 of the switch S1, the received packet is a configuration message packet and the input port number of the received packet is identical with the input port number of the routing rule, namely that the switch S1 has the routing rule corresponding to the controller sending the configuration message packet. In this case, the processing unit 16 in the switch S1 executes the action instruction specified in the routing rule. In an embodiment, said action instruction is OFPP_FLOOD, meaning the configuration message packet will be sent, by transceiver 12 of the switch S1, to FLOOD reserved port defined by OpenFlow. Generally speaking, FLOOD reserved port represents all connecting ports except for the input port of this configuration message packet and connecting ports forbidden by MST (Minimum Spanning Tree) protocol (indicated by OFPPS_BLOCKED) The switch S1 can also specify "Flooding" action suitable for broadcasting in VLAN (Virtual Local Area Network). In a practical aspect, the controller C instructs the switch S1 to use ALL reserved port for achieving similar broadcasting effect just like using FLOOD reserved port. The disclosure does not restrict the broadcasting manner. Regarding the SDN system with multiple controllers, in addition to comparing the input port number used to receive the configuration message packet, the switch S1 further compares the IP address of the controller sending the configuration message packet. The switch S1 executes the action instruction in a routing rule if the switch S1 finds a matching input port number between the received packet and the routing rule as well as a matching controller IP address between the received configuration message packet and the routing rule.

In a second condition, the switch S1 determines that the received packet is a configuration message packet, and the input port number occupied by the packet is not consistent with the input port number of the routing rules. The processing unit 16 of switch S1 then encapsulates this configuration message packet into a Packet-In message and sends said Packet-In message to the controller C. In other embodiments, the switch S1 may drop this kind of packet directly. And in the system with multiple controllers, the switch S1 not only compares the input port number occupied by the received configuration message packet but also compares the controller's IP address of the configuration message packet. If the input port number of the received configuration message packet is different from the input port number of the routing rule, or if the controller's IP address in the received configuration message packet is different from the controller's IP address specified in the routing rule, under the above situations, the switch S1 encapsulates this packet into a Packet-In message then send said message to the controller C or drop this packet directly.

In a third condition, the switch S1 determines that the received packet is not a configuration message packet, then the switch S1 further searches for the flow entries in flow table to check if any Match Field matching the packet information received this time. If yes, the switch S1 processes the packet according to the instruction corresponding to the Match Field. Otherwise, the switch S1 processes the packet according to the instruction corresponding to the Table-Miss Flow entry, or the switch S1 searches for the next flow table through the pipeline.

In a large network, considering the deployment cost, a controller may have physical links to only one or few switches that close to the controller geographically. For those long-distant switches, the controller forwards packets to the target switch by intermediate switches. For example, please refer to the FIG. 1, the controller C sends a packet to switch S4 through switch S1 and switch S5. In an embodiment that the controller C is in communicable connection with the switch network SN, for an accomplishment of auto-deploying all switches S1-S5 in switch network SN, the controller C actively sends the configuration message packet and the routing rule to the switch S1 next to the controller C. Through the switch S1 broadcasting the configuration message packet by FLOOD action instruction, the configuration message packet is spread out to entire switch network SN layer by layer, so that all switches are initialized and deployed. Comparing to the prior art that the switch S1 actively ask the controller for the configuration parameters, the concept of "a controller actively broadcasting the configuration message" of the present disclosure meets the original spirit of SDN undoubtedly.

As described above, the topology of the large network may lead to "Switching Loop," which means there are communication paths between two switches instead of one single path. Take an example in FIG. 1, the switch S1 can access the switch S4 via connections e3 and e4, likewise the switch S1 can access the switch S1 via connections e5 and e6. Another kind of switching loop is that two connecting ports of a switch connect to each other. When broadcasting a configuration message packet in the switch network SN with switching loops, the packet may be repeatedly sent in the loop, causing a broadcast storm. A broadcast storm occupies most of the network bandwidth to paralyze the network. Meanwhile, the broadcast storm consumes sufficient network resources so as to render the network unable to transport normal traffic.

In an embodiment, to avoid the configuration message packet sent by controller C causing a broadcast storm, when the switch S1 executing the forwarding procedure, for the configuration message packet not from the controller C, the switch S1 viewed the packet as a packet coming from a certain switching loop path. Thus, the switch S1 encapsulates the packet into a Packet-In message and returns the message to the controller C. Therefore, the controller C can decide how to cope with this kind of packets. In another embodiment, the controller C sends a routing rule including "Drop" action instruction, to instruct the switch S1 to directly drop the configuration message packets which do not come from the controller C, thus decreasing the network traffic to avoid the broadcast storm.

Another embodiment relates to a method for deploying switch in SDN system wherein the system is shown in FIG. 1, a switch network SN in communicable connection with a controller C as illustrated above. Please refer to FIG. 3 and FIG. 4. Regarding the method for deploying switch, after receiving the configuration message packet (step S21 and step S61) from the controller C by the switch S1, two parts associated to the forwarding procedure and the connection procedure are respectively performed. For the part associated with the forwarding procedure, it basically depends on whether there exists routing rule(s) in the switch S1 so that the switch S1 may directly forward the received configuration message packet to other switch(es) next thereto or forward it according to the routing rule. In the following illustration, for the reason of effectively avoiding the broadcast storm, it mainly emphasizes on step S22 and step S62, the switch S1 executing the forwarding procedure according to the routing rule. As for the connection procedure, there are two stages. Stage 1 is about the switch S1 executing the connection procedure according to the configuration message packet as shown in step S23-S24 and step S63-S64. Stage 2 relates to that the controller C sending the routing rule via the channel established with the switch S1 as shown in step S25 and step S65. The following paragraphs are about the detail implementation of each procedure.

Figure 3:
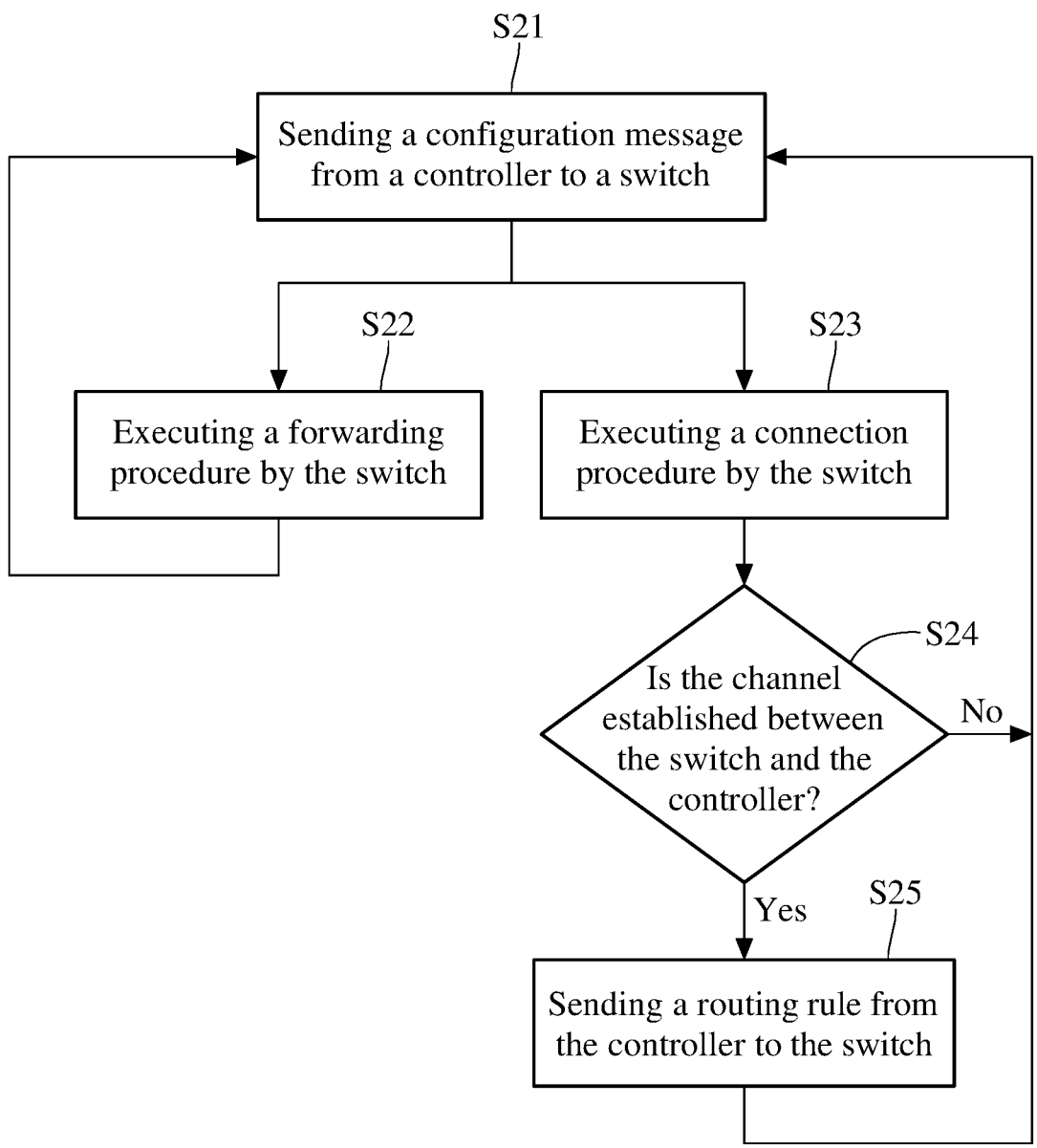
FIG. 3 is a detailed flowchart of a method for deploying switch according to an embodiment of the present disclosure.
Figure 4:
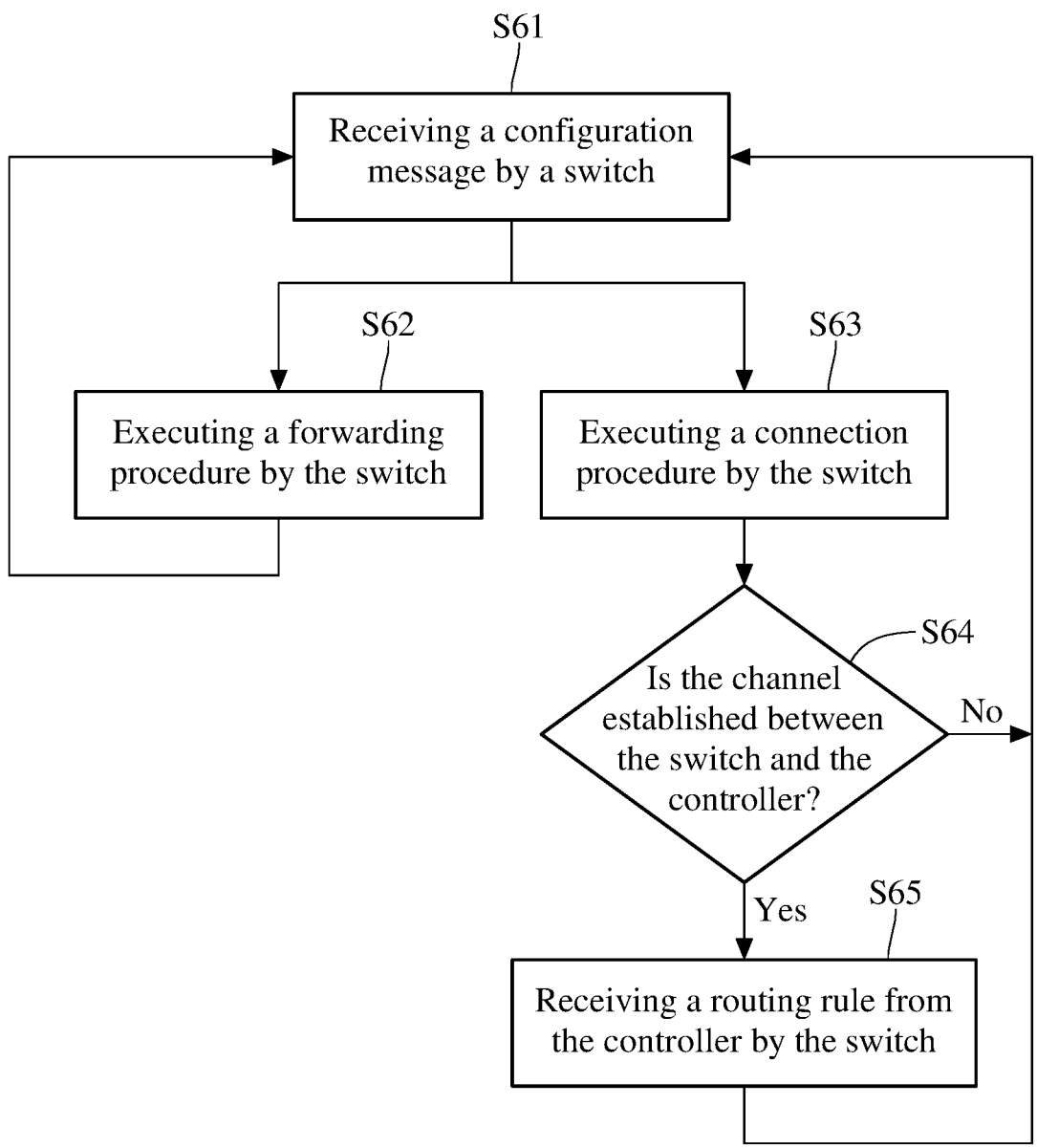
FIG. 4 is a detailed flowchart of a method for deploying switch applicable for at least one switch according to another embodiment of the present disclosure.

Please refer to step S21 in FIG. 3 and step S61 in FIG. 4, the controller C actively sends the configuration message packet to the switch S1. The format of the configuration message packet comprises, for example, LLDPDU used in packet broadcasting or IP header used in broadcasting/multicasting. Furthermore, the configuration message comprises the controller's IP address and multiple configuration parameters. The configuration parameters comprise the number of switch's connecting port, type of communication protocol, controller's connection mode and the version number of the communication protocol. Before the channel estimated between the switch S1 and the controller C, the controller C may tell the switch S1 of its connecting port number by the configuration parameters in advance so that the switch S1 records this number of the controller's connecting port for usage in the forwarding procedure. The method of the disclosure adopts a commonly used protocol such as TCP, TLS, SCTP or SSL to serve as the communication protocol. Typically, the ways to establish the channel between a controller and a switch comprises "Active mode" and "Passive mode." In the active mode, the switch S1 actively establishes the channel to the controller C since the switch S1 knows the IP address of the controller once the switch receiving the configuration message packet. On the other hand, in the passive mode, the switch passively waits for the controller sending the message for establishing the channel. The version number of the communication protocol should also be sent to the switch S1 by the controller C if the communication protocol is changed in the SDN system.

Figure 5:
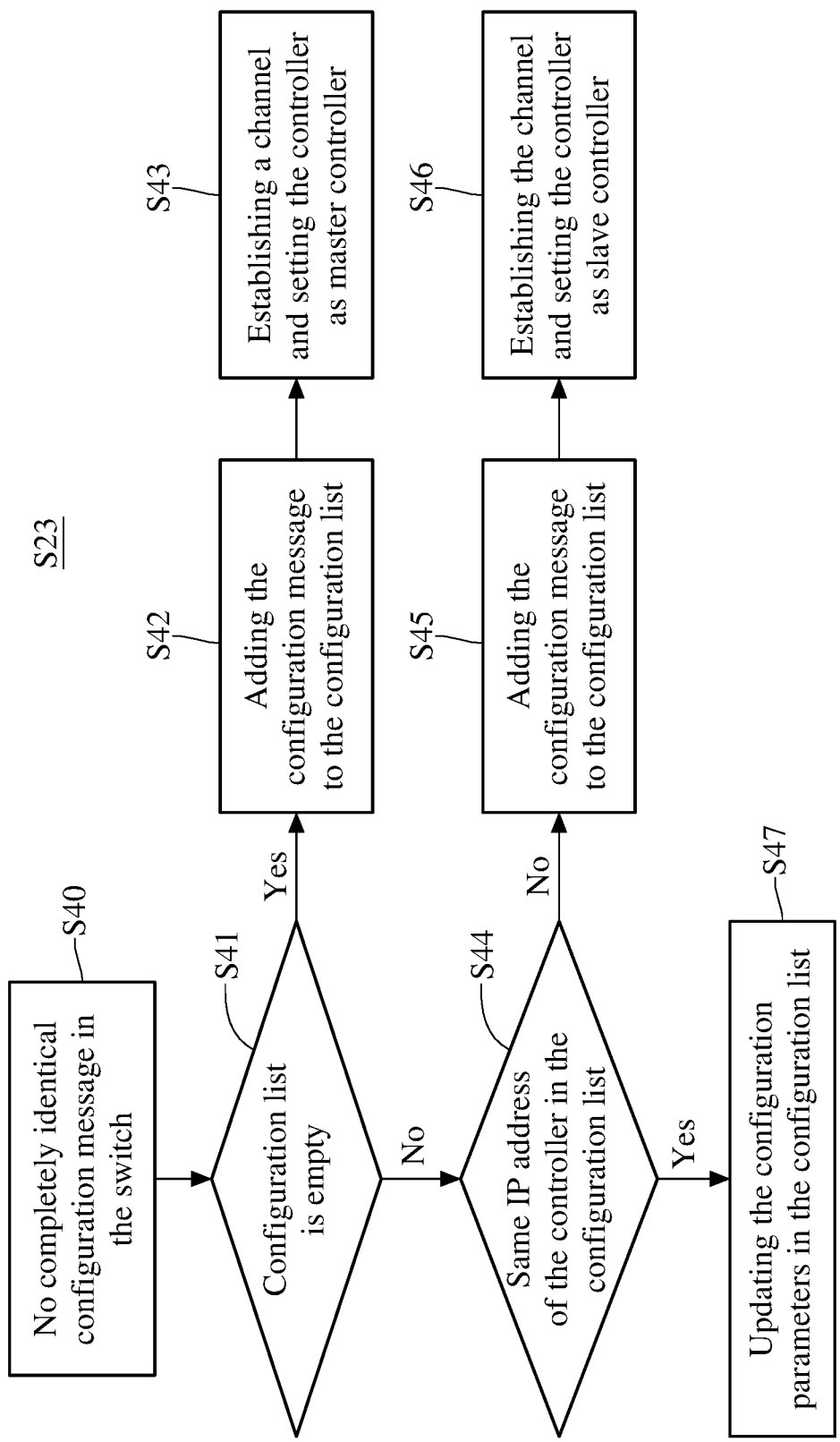
FIG. 5 is a detailed flowchart of the connection procedure according to another embodiment of the present disclosure.

Please refer to step S23-S25 in FIG. 3, step S63-S65 in FIG. 4 and FIG. 5. After receiving the configuration message packet, the switch S1 searches the configuration list stored in the switch S1 for a record identical to what is in the configuration message packet. The configuration list records all of the information that the switch S1 has ever received.

If no identical record comparing to the configuration message sent by the controller C exists in the configuration list, there are three possibilities described below. (1) The switch S1 hasn't received any configuration message packet previously. (2) The switch S1 has already received one or some configuration packets from other controllers, but the switch S1 receives the configuration message packet from the controller C for the first time. (3) The switch S1 receives the configuration message packet sent by the same controller for more than once, but at least one parameter in the packet sent this time differs from that stored in the configuration list. Case (1) and case (2) stated above are related to a configuration message packet from a new controller, which can be the master controller or a slave one of the switch S1. However, the case (3) needs the switch S1 to update the content of the configuration list for a controller, while a channel between the switch S1 and this controller has been built previously. As a result, the channel between the switch S1 and the new controller has to be established or renewed, so the switch S1 executes the connection procedure.

If the switch S1 finds out identical record compared to the received configuration message, it means that the switch S1 has received the same configuration message from the same controller C for the second time or even more. In other words, the controller C repeatedly sends same configuration message packets, and at least two packets of them are received by the same switch S1. Under this situation, the switch S1 needs to forward the duplicated configuration message packet to other switches S2-S5 that are probably not be configured, thus the switch S1 executes the forwarding procedure.

Specifically, please refer to FIG. 5 for the step S40-S43. In the possible situation (1), after the switch confirmed that there is no identical record in the configuration list comparing to the configuration message packet and the configuration list is empty (meaning that after the switch S1 powered on, the switch S1 has never received any configuration message packet from any controller), the switch S1 adds the information inside the configuration message packet to the configuration list. Namely, the switch S1 adds the controller's IP address and the configuration parameters to the configuration list. Thereafter, the switch S1 sends a channel establishment request to the controller according to the IP address of the controller and the configuration parameters. After the switch S1 ensured that channel was successfully established, the switch S1 set the controller C as its master controller.

Please refer to FIG. 5 for the step S44-S46. In the possible situation (2), if the configuration list is not empty, confirmed by the switch S1, and the configuration list has not record the controller's IP address in the configuration message, meaning the configuration message is sent by a controller never sending such a message to the switch S1, the switch S1 adds the information of the configuration message into the configuration, i.e., adding the controller's IP address and the configuration parameters of the configuration message into the configuration list. Thereafter, the switch S1 sends a channel establishment request to the controller according to the controller's IP address and the configuration parameters newly added. After the switch S1 confirmed the channel is established successfully, the switch S1 sets the controller as a slave controller. Generally, in comparison with the master controller, the slave controller can only write the routing rule associated with the slave controller itself, read the switch's status or passively receive the switch's messages.

Foregoing connection procedure is under the assumption of multiple controllers respectively sending configuration message packets one after another to the same switch S1 of the switch network SN. Typically, the switch S1 sets the controller sending the very first configuration message to it as its master controller, and the other controllers establishing channels to the switch S1 later are slave controllers of the switch S1. However, the present disclosure is not restricted to such kind of master/slave setting rule. On the other hand, if the type of communication protocol applied in the SDN system is OpenFlow, a new master controller can be selected from the slave controllers by election or other manners when the master controller is offline or broken, and the new master controller sends a "Role-Request" message to the switch S1.

Please refer to FIG. 5. In the possible situation (3), the configuration list is not empty (with records thereon) and the configuration list has the controller's IP address the same as the one in the configuration message received this time, while the configuration parameters corresponding to the controller's IP address in the configuration list are at least partially different from those of the configuration message received this time. Such situation means that the switch has received a configuration message from the same controller before. Therefore, as shown in step S47, the switch S1 finds out the record corresponding to the controller's IP address of the configuration message, then updates the record according to the configuration parameters in the configuration message received this time.

Please refer to the step S24-S25 shown in FIG. 3 (or step S64-S65 shown in FIG. 4). After the switch S1 executed the connection procedure, if the switch S1 didn't establish a channel to the controller sending the configuration message (the switch S1 executed the step S47 shown in FIG. 5), the switch S1 waits for the configuration message packet coming next time (back to step S21 or step S61). However, since there can be some switches (such as S2-S4) not configured yet in the switch network SN, the configured switch S1 has to forward the configuration message packet of the controller C so that all of the switches in the switch network SN can be configured. On the other hand, if the switch S1 establishes a channel to the controller C sending the configuration message (the switch S1 executed the step S43 or S46 shown in FIG. 5) after the connection procedure, the controller C sends a routing rule to the switch S1 as shown in step S25 (or step S65). Thereafter, the switch S1 waits for the configuration message packet coming next time (back to step S21 or step S61).

Please return to the step S21 in FIG. 3, the controller C may send another configuration message packet identical to the previous one. Practically, the network administrator indicates the controller C to send, in a broadcast way or in a multicast way, the identical configuration message packets to all of the switches having communicable connections with the controller C. The purpose of repeatedly sending configuration message packets is for the accomplishment of deploying all of the switches S1-S5 in the SDN system.

When the switch S1 with routing rules stored inside receiving another configuration message packet, the switch S1 executes the forwarding procedure according to the routing rule. In an embodiment, based on the forwarding procedure, the switch S1 receives the configuration message packet from the controller C and then forwards to other switches S2, S3 and S5 as shown in FIG. 1, so that switches having no directly communicable connection to the controller C can be configured. In another embodiment of the forwarding procedure, the switch S1 drops the configuration message packet sent from other switches S2, S3 and S5 or returns said packet to the controller C.

Specifically, the routing rule comes from the controller C and the routing rule comprises the Ethernet type, the input port number of switch and the action instruction. The switch S1 processes the received packets according to the defined action instruction. Although the routing rule sending as shown in step S25 or step S65 is adapted for configuration packets, the disclosure does not restrict the way to apply the routing rule thus. For example, in the OpenFlow protocol, after sending the routing rule for configuration packets, the controller C which employs a proactive mode continues to send another routing rule or flow table entry for normal data packet. Accordingly, it saves the time that the switch S1 sends another message to ask the controller C about how to process the data packets.

Particularly, some details of the forwarding procedure are further illustrated as follows. The switch S1 determines whether or not to execute the forwarding procedure according to the Ethernet type of the packet and the switch's input port number of the packet. Specifically, after the switch S1 receives the packet, based on the Ethernet type of the packet, the switch S1 determines that the packet is a configuration message packet or a normal data packet. The configuration message packet may adopt LLDPDU format for broadcasting or IP header format for multicasting. Above two formats have different Ethernet types respectively. Furthermore, after the channel is established between the switch S1 and the controller C, the switch S1 tells the controller C about switch's connecting port number occupied for the channel, so that the controller C may specify this connecting port number when sending the routing rule. Accordingly, when the switch S1 receives the packet through this connecting port, the switch S1 can determine whether or not the packet comes from the master controller of the switch S1 according to the routing rule.

When switch S1 found the two parameters illustrated above in the routing rule (i.e., the Ethernet type and the switch's input port number of the configuration message packet), the switch S1 executes the action instruction. For instance, the switch S1 uses FLOOD instruction to broadcast or multicast the configuration message packet to other switches S2-S5. If the switch S1 found only the Ethernet type matches the routing rule and the switch's input port number is not consistent, the switch S1 encapsulates the configuration message packet into Packet-In message and then sends the Packet-In message to the controller. Alternatively, the switch S1 may directly drop the configuration message packet according to the routing rule.

In sum, the present disclosure provides an SDN system with auto-deployed switch, a method for deploying switch in the SDN system, an automatic-configured switch applicable for the SDN system and a method for deploying switch. The SDN system comprises a controller actively sending the configuration message packet to the switch. The switch establishes a channel to the controller according to the configuration message packet. Thereafter, the switch receives the routing rule indicated from the controller. Finally, the switch continues to receive the configuration message packet and forwards the configuration message packet to other switches in the switch network, for achieving the auto-deployment of all switches. By the setting of the routing rule, the present disclosure prevents the SDN system from the broadcast storm caused by transmission of the configuration messages. Furthermore, whenever the network administrator modifies the configuration parameters, according to the method disclosed above, all that he needs is to send a configuration message packet with new configuration parameters from the controller to the switch, and the switch updates the parameters as soon as the switch receives the packet with new parameters. Therefore, for a large network with a great number of parameter setting tasks, an embodiment of the provided method for deploying switch can save the configuring time and human effort on deploying switches bit by bit, effectively avoid typing mistakes, as well as improve the initialization efficiency after the network devices were settled down.

What is claimed is:

1. A method for deploying a switch in a Software-Defined Network (SDN) system, wherein the SDN system comprises a controller in communicable connection with the switch, wherein the switch belongs to a switch network, and the switch network has a plurality of switches in communicable connection with one another, with the method comprising:
    sending a configuration message from the controller to the switch, wherein the configuration message comprises an IP address of the controller and a plurality of configuration parameters associated with the controller, and the plurality of configuration parameters comprise a type of communication protocol and a connection mode of the controller;
    receiving the configuration message by the switch;
    establishing a channel between the switch and the controller according to the IP address and the plurality of configuration parameters by the switch;
    after establishing the channel between the switch and the controller, sending a routing rule from the controller to the switch; and
    sending the configuration message selectively by the switch according to the routing rule, wherein the routing rule comprises an input port number of the switch and an action instruction.

2. The method of claim 1, wherein the switch further comprises a configuration list for recording the IP address and the plurality of configuration parameters; when the switch establishes the channel to the controller according to the IP address and the plurality of configuration parameters, the switch executes a connection procedure, with the connection procedure comprising:
    when the configuration list is empty, adding the configuration message to the configuration list by the switch, establishing the channel to the controller according to the IP address and the plurality of configuration parameters by the switch, and setting the controller as a master controller of the switch by the switch;
    when the configuration list is not empty and the IP address of the configuration message is not recorded in the configuration list, adding the configuration message to the configuration list by the switch, establishing the channel to the controller according to the IP address and the plurality of configuration parameters by the switch, and setting the controller as a slave controller of the switch by the switch; or
    when the configuration list is not empty and the IP address of the configuration message is recorded in the configuration list, updating the configuration list according to the plurality of configuration parameters by the switch.

3. The method of claim 1, wherein the plurality of configuration parameters further comprise a connecting port number of the controller.

4. The method of claim 1, wherein the controller sends the configuration message in broadcast packet format or in multicast packet format.

5. The method of claim 1 further comprising sending another configuration message to the switch by the controller after sending the configuration message by the controller, wherein the another configuration message comprises the IP address of the controller and the plurality of configuration parameters.

6. The method of claim 1, further comprising sending another configuration message to the switch by the controller after sending the configuration message by the controller, with said another configuration message comprising the IP address of the controller and the plurality of configuration parameters; and executing a forwarding procedure by the switch after the switch receives said another configuration message and the routing rule, wherein the forwarding procedure comprises:
    comparing an input port number of said another configuration message and the input port number of the switch of the routing rule by the switch,
    when the input port number of said another configuration message and the input port number of the switch of the routing rule are identical, sending said another configuration message in broadcast packet format to another switch connected to the switch according to the action instruction by the switch, when the input port number of said another configuration message and the input port number of the switch of the routing rule are different, dropping said another configuration message or returning said another configuration message to the controller according to the action instruction by the switch.

7. A Software-Defined Network (SDN) system with auto-deployed switch, the SDN system comprising:
a controller configured for sending a configuration message, wherein the configuration message comprises an IP (Internet Protocol) address of the controller and a plurality of configuration parameters; and
a switch in communicable connection with the controller, wherein the switch comprises a transceiver, a storage unit and a processing unit, the transceiver receives the configuration message, the storage unit is configured to store the configuration message, and the processing unit electrically connects with the transceiver and the storage unit and the processing unit is configured to establish a channel to the controller according to the IP address and the plurality of configuration parameters associated with the controller, and the plurality of configuration parameters comprise a type of communication protocol and a connection mode of the controller;
wherein the switch belongs to a switch network, the switch network has a plurality of switches in communicable connection with one another,
after the channel is established between the switch and the controller, the controller sends a routing rule to the switch, and
the storage unit is further configured to store a routing rule, the processing unit is further configured to control the transceiver to send the configuration message selectively according to the routing rule, wherein the routing rule comprises an input port number of the switch and an action instruction.

8. The system of claim 7, wherein the storage unit comprises a configuration list for recording the IP address and the plurality of configuration parameters, and the processing unit executes a connection procedure when the switch establishes the channel to the controller according to the IP address and the plurality of configuration parameters, wherein the connection procedure comprises:
when the configuration list is empty, adding the configuration message to the configuration list, establishing the channel to the controller according to the IP address and the plurality of configuration parameters by the transceiver controlled by the processing unit, and setting the controller as a master controller of the switch;
when the configuration list is not empty and the IP address of the configuration message is not recorded in the configuration list, adding the configuration message to the configuration list, establishing the channel to the controller according to the IP address and the plurality of configuration parameters by the switch, and setting the controller as a slave controller of the switch; or
when the configuration list is not empty and the IP address of the configuration message is recorded in the configuration list, updating the configuration list by the switch according to the plurality of configuration parameters.

9. The system of claim 7, wherein the plurality of configuration parameters further comprise a connecting port number of the controller.

10. The system of claim 7, wherein the controller sends the configuration message in broadcast packet format or in multicast packet format.

11. The system of claim 7, after sending the configuration message by the controller, the controller sends another configuration message to the switch, with said another configuration message comprising the IP address of the controller and the plurality of configuration parameters.

12. The system of claim 11, wherein the controller comprises a timer for adjusting an interval time between the configuration message sent by the controller and said another configuration message sent by the controller.

13. The system of claim 7, after sending the configuration message by the controller, the controller sends another configuration message, with said another configuration message comprising the IP address of the controller and the plurality of configuration parameters; after receiving said another configuration message and the routing rule, the processing unit is further configured to execute a forwarding procedure, wherein the forwarding procedure comprises:
comparing an input port number of said another configuration message and the input port number of the switch of the routing rule,
when the input port number of said another configuration message and the input port number of the switch of the routing rule are identical, controlling the transceiver to send said another configuration message in broadcast packet format to another switch connected to the switch according to the action instruction,
when the input port number of said another configuration message and the input port number of the switch of the routing rule are different, dropping or returning said another configuration message to the controller according to the action instruction.

14. A method for deploying switch, using at least one switch in communicable connection with a controller, wherein said at least one switch belongs to a switch network, and the switch network has a plurality of switches in communicable connection with one another, with the method comprising:
receiving a configuration message, wherein the configuration message comprises an IP address of the controller and a plurality of configuration parameters associated with the controller, and the plurality of configuration parameters comprise a type of communication protocol and a connection mode of the controller;
establishing a channel to the controller according to the IP address and the plurality of configuration parameters;
after establishing the channel between the at least one switch and the controller, receiving a routing rule; and
sending the configuration message selectively according to the routing rule, wherein the routing rule comprises an input port number of the switch and an action instruction.

15. The method of claim 14, wherein the at least one switch comprises a configuration list for recording the IP address and the plurality of configuration parameters; the method further comprising when the at least one switch establishes the channel to the controller according to the IP address and the plurality of configuration parameters, executing a connection procedure, wherein the connection procedure comprising:
when the configuration list is empty, adding the configuration message to the configuration list, establishing the channel to the controller according to the IP address and the plurality of configuration parameters, and setting the controller as a master controller of the at least one switch;

when the configuration list is not empty and the IP address of the configuration message is not recorded in the configuration list, adding the configuration message to the configuration list, establishing the channel to the controller according to the IP address and the plurality of configuration parameters, and setting the controller as a slave controller of the at least one switch; and when the configuration list is not empty and the IP address of the configuration message is recorded in the configuration list, updating the configuration list according to the plurality of configuration parameters.

16. The method of claim 14, wherein the plurality of configuration parameters further comprise a connecting port number of the controller.

17. The method of claim 14, further comprising after receiving the configuration message, receiving another configuration message, wherein said another configuration message comprises the IP address of the controller and the plurality of configuration parameters.

18. The method of claim 14, further comprising after receiving the configuration message, receiving another configuration message, wherein said another configuration message comprises the IP address of the controller and the plurality of configuration parameters; and executing a forwarding procedure after receiving said another configuration message and the routing rule, wherein the forwarding procedure comprises:

comparing an input port number of said another configuration message and the input port number of the switch receiving said another configuration message of the routing rule, when the input port number of said another configuration message and the input port number of the switch receiving said another configuration message of the routing rule are identical, sending said another configuration message in broadcast packet format to other switches connected to the switch receiving said another configuration message according to the action instruction, when the input port number of said another configuration message and the input port number of the switch receiving said another configuration message of the routing rule are different, dropping said another configuration message or returning said another configuration message to the controller according to the action instruction.

19. An automatic-configured switch, in communicable connection with a controller, wherein the switch belongs to a switch network, and the switch network has a plurality of switches having communicable connection with one another, with the switch comprising:

a transceiver configured to receive a configuration message, wherein the configuration message comprises an IP address of the controller and a plurality of configuration parameters associated with the controller, and the plurality of configuration parameters comprise a type of communication protocol and a connection mode of the controller;

a storage unit configured to store the configuration message; and a processing unit electrically connecting with the transceiver and the storage unit and configured to establish a channel to the controller according to the IP address and the plurality of configuration parameters;

wherein the storage unit is further configured to store a routing rule, and the processing unit is further configured to control the transceiver to send the configuration message selectively according to the routing rule, wherein the routing rule comprises an input port number of the switch and an action instruction.

20. The switch of claim 19, wherein the storage unit comprises a configuration list for recording the IP address and the plurality of configuration parameters, when the switch establishes the channel to the controller according to the IP address and the plurality of configuration parameters, the processing unit is further configured to execute a connection procedure, wherein the connection procedure comprises:

when the configuration list is empty, adding the configuration message to the configuration list, establishing the channel to the controller according to the IP address and the plurality of configuration parameters by the transceiver controlled by the processing unit, and setting the controller as a master controller of the switch;

when the configuration list is not empty and the IP address of the configuration message is not recorded in the configuration list, adding the configuration message to the configuration list, establishing the channel to the controller according to the IP address and the plurality of configuration parameters by the transceiver controlled by the processing unit, and setting the controller as a slave controller of the switch; or when the configuration list is not empty and the IP address of the configuration message is recorded in the configuration list, updating the configuration list according to the plurality of configuration parameters.

21. The switch of claim 19, wherein the plurality of configuration parameters further comprise a connecting port number of the controller.

22. The switch of 22, after the transceiver receives another configuration message, the processing unit is further configured to execute a forwarding procedure, wherein the forwarding procedure comprises:

comparing an input port number of said another configuration message and the input port number of the switch of the routing rule, when the input port number of said another configuration message and the input port number of the switch of the routing rule are identical, controlling the transceiver to send said another configuration message in broadcast packet format to another switch connected to the switch according to the action instruction, when the input port number of said another configuration message and the input port number of the switch of the routing rule are different, dropping or returning said another configuration message to the controller according to the action instruction.

* * * * *